Figure 1:
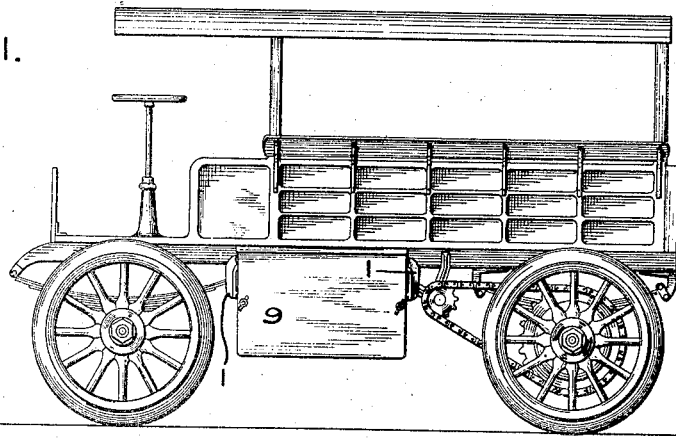

R. McA. LLOYD.
BATTERY SUPPORT.
APPLICATION FILED MAY 7, 1912.

1,079,709.

Patented Nov. 25, 1913.

Witnesses:

Inventor:
Robert McA. Lloyd,
by
His Attorney.

UNITED STATES PATENT OFFICE.

ROBERT McA. LLOYD, OF OYSTER BAY, NEW YORK, ASSIGNOR TO GENERAL ELECTRIC COMPANY, A CORPORATION OF NEW YORK.

BATTERY-SUPPORT.

1,079,709.  Specification of Letters Patent.  Patented Nov. 25, 1913.

Application filed May 7, 1912. Serial No. 695,680.

*To all whom it may concern:*

Be it known that I, ROBERT MCA. LLOYD, a citizen of the United States, residing at Oyster Bay, county of Nassau, State of New York, have invented certain new and useful Improvements in Battery-Supports, of which the following is a specification.

My invention relates to battery cradles for vehicles and the supports therefor.

Batteries are in common use in connection with vehicles for supplying energy for moving the vehicle, for lighting, etc. It is desirable both to be able to readily remove and attach the battery as a whole and to have access to the individual cells without the complete removal of all the cells. If a battery may be readily removed and attached, two or more batteries may be provided for a single vehicle and the vehicle used continuously; one or more of the batteries may be receiving its charge at the station while one is driving the vehicle. When minor changes in one or a few cells are necessary or desirable, which may be required on the road even, as the short circuiting of a defective cell, the adding of water, etc., it is obviously advantageous to be able to make these changes without removing the entire battery and without having to run the vehicle over a pit.

The object of my invention is the provision of novel means for supporting the cradle carrying the battery which, while allowing its ready attachment and detachment, when combined with a proper cradle, allows also the ready withdrawal and insertion of any or all sections of the battery without the removal of the cradle.

In accordance with my invention I carry the battery cradle on a plurality of hooks pivotally supported and extending beneath the vehicle body and adapted to be brought into engagement with the ends of the cradle when it is in position. Provision is also made for preventing the cradle from swinging when it is suspended on the hooks. Such supporting means engaging only the ends of the cradle may be combined with a cradle provided with side openings, in which case any or all sections of the battery may be removed without the removal of the cradle.

In the drawing which forms a part of this specification is illustrated one construction involving my invention.

Figure 2:
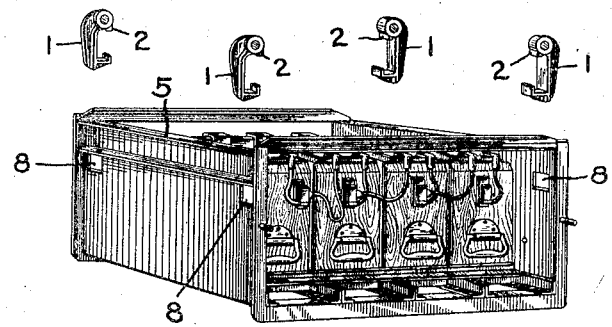
Figure 4:
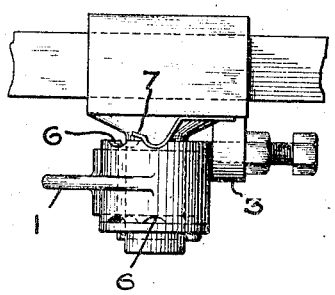
Figure 3:
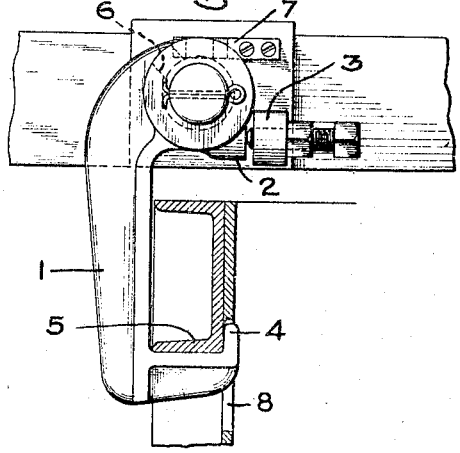

Figure 1 is a side elevation of a vehicle showing the battery cradle supported in position; Fig. 2 is a detached perspective of the supporting means and cradle; and Figs. 3 and 4 are detail views of parts of the attaching means.

The hooks 1 are preferably mounted in two groups, one group facing the forward and the other facing the rear end of the vehicle. The hooks are so positioned that one group engages one end of the battery cradle and the other group engages the other end, when the cradle is in position. The hooks may be pivoted to any suitable part of the vehicle structure and extend below the body. They are shown on the drawing as pivoted to the frame of the vehicle beneath the body.

In order to prevent a swinging movement of the cradle, as for example, when the vehicle is started or stopped, I preferably provide abutments 2 on the hooks and coöperating abutments 3 located adjacent thereto on the bases on which the hooks are mounted. The abutments, while allowing unlimited movement in a direction away from the cradle, limit the movement of the hooks in the engaging direction, and may be made adjustable as shown in the drawing. The engaging members 5 of the cradle should fit fairly closely between the points 4 and the bodies of the hooks and this alone may be sufficient to prevent undesirable swinging. The abutments for this purpose are, however, preferable and when they are used small clearances between the members 5 and the bodies of the hooks are allowable to permit the ready seating of the members. The abutments should be so adjusted as to permit movement in the engaging directions only of a sufficient amount to allow the engagements of the engaging members 5 of the cradle behind the points 4 of the hooks. I have further provided the hooks with the recesses 6 and coöperating therewith spring members 7. These recesses and the coöperating springs are so located that the springs will yieldingly hold the hooks in the engaged or disengaged positions, thereby facilitating the ready attachment and detachment of the cradle. By providing recesses 6 on both sides of each hook, it is necessary to make but one style of hook, which, being reversible, is interchangeable with all the others.

I prefer to construct the battery cradle with longitudinal engaging members 5, which in addition may be parts of the frame of the cradle. In order that the hooks may engage with these engaging members in cases where the ends of the cradle are attached to them, it may be necessary to cut openings 8 in the ends, as illustrated. By making these openings of a size only sufficient to accommodate the hooks, movement of the cradle in a direction transverse to the vehicle is prevented.

To detach the cradle from the hooks, it is merely necessary to raise the cradle above the ends of the points 4 by any suitable means. The hooks may then be thrown out to disengaging position and are automatically yieldingly held in that position by the springs 7 engaging with the proper recesses 6. The cradle is now free from the vehicle and may be removed on a truck. The operation of attachment of the cradle to the vehicle is as simple, and is merely the reversal of the detaching operation.

I am aware that battery cradles of the same general type as that shown in the drawings, that is cradles wherein the cells are located in sections, each section separate and distinct from every other section and capable of removal through the side of the cradle when the detachable side cover 9 is removed, were in use prior to my invention but so far as I know all were attached to the vehicle in a manner permanent to all practical purposes. By providing cradle-end-engaging, detachable supporting means with such a cradle, I have access to the individual cells and cell sections without removing the cradle as a whole and also have a readily detachable cradle. The combination of the specific attaching and supporting means above disclosed with the cradle I have shown, I have found to be entirely satisfactory in practice.

What I claim as new and desire to secure by Letters Patent of the United States, is:—

1. A battery cradle support for vehicles comprising in combination a plurality of hooks facing in different directions, pivotally supported and extending beneath the vehicle body and adapted to be brought into engagement with the battery cradle to support the same, and abutments for limiting the movement of the hooks in the engaging directions.

2. A battery cradle support for vehicles comprising in combination a plurality of hooks pivotally supported and extending beneath the vehicle body and adapted to be brought into engagement with the battery cradle to support the same, and adjustable means for preventing the swinging of the cradle and hooks.

3. A battery cradle support for vehicles comprising in combination a plurality of hooks facing in different directions, pivotally supported and extending beneath the vehicle body and adapted to be brought into engagement with the battery cradle to support the same, and adjustable abutments for limiting the movement of the hooks in the engaging directions.

4. The combination with a battery cradle for vehicles, of hooks pivotally supported and extending beneath the vehicle body and engaging the top frame of the battery cradle to support the same, and means for preventing the swinging of the cradle and hooks.

5. The combination with a battery cradle for vehicles, said cradle being provided with supporting members extending laterally thereof, of hooks pivotally supported and extending beneath the vehicle body and closely engaging the cradle supporting members to support the cradle, and abutments for limiting the movements of the hooks.

6. A battery cradle support for vehicles comprising in combination hooks facing one end of the vehicle, and other hooks facing the other end of the vehicle, all said hooks being pivotally supported and extending beneath the vehicle body and adapted to be brought into engagement with the ends of the battery cradle to support the cradle, and abutments to limit the movements of the hooks in the engaging directions.

7. A battery cradle support for vehicles comprising in combination hooks facing one end of the vehicle, and other hooks facing the other end of the vehicle, all said hooks being pivotally supported and extending beneath the vehicle body and adapted to be brought into engagement with the ends of the battery cradle to support the cradle, and adjustable abutments to limit the movements of the hooks in the engaging directions.

8. A battery cradle support for vehicles comprising in combination hooks facing one end of the vehicle, and other hooks facing the other end of the vehicle, all said hooks being pivotally supported and extending beneath the vehicle body and adapted to be brought into engagement with the ends of the battery cradle to support the cradle, means for yieldingly holding the hooks in different positions, and adjustable abutments to limit the movements of the hooks in the engaging directions.

9. A battery cradle support for vehicles comprising in combination a plurality of hooks pivotally supported and extending beneath the vehicle body and adapted to be brought into engagement with the battery cradle to support the same, means for yieldingly holding said hooks in different positions, and means for preventing the swinging of the cradle and hooks.

10. A battery cradle support for vehicles comprising in combination a plurality of hooks facing in different directions, pivotally supported and extending beneath the vehicle body and adapted to be brought into engagement with the battery cradle to support the same, means for yieldingly holding said hooks in different positions, and abutments for limiting the movements of the hooks in the engaging directions.

11. A battery cradle support for vehicles comprising in combination a plurality of hooks pivotally supported and extending beneath the vehicle body and adapted to be brought into engagement with the battery cradle to support the same, means for yieldingly holding said hooks in different positions, and adjustable means for preventing the swinging of the cradle and hooks.

12. The combination with a vehicle, of a battery cradle provided with an opening at one side for the removal of the battery without the removal of the cradle and supporting members attached to the vehicle and extending beneath the vehicle body arranged to be moved into engagement with the ends of the cradle to support the same.

13. The combination with a vehicle, of a battery cradle provided with an opening at one side for the removal of the battery without the removal of the cradle, and hooks pivotally supported and extending beneath the vehicle adapted to engage the ends of the cradle to support the same.

In witness whereof, I have hereunto set my hand this fourth day of May, 1912.

ROBERT McA. LLOYD.

Witnesses:
L. M. RIEDE,
T. E. QUEENEY.

Copies of this patent may be obtained for five cents each, by addressing the "Commissioner of Patents, Washington, D. C."